T. MIDGLEY
TIRE TREAD BUILDING MACHINE.
APPLICATION FILED MAR. 18, 1914.

1,256,716.

Patented Feb. 19, 1918
10 SHEETS—SHEET 8.

Witnesses
Veronica Braun
Francis Boyle

Inventor
Thomas Midgley,
By Ernest Hopkinson
his Attorney

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

TIRE-TREAD-BUILDING MACHINE.

1,256,716.  Specification of Letters Patent.  Patented Feb. 19, 1918.

Application filed March 18, 1914. Serial No. 825,632.

*To all whom it may concern:*

Be it known that I, THOMAS MIDGLEY, a citizen of the United States, residing at Worthington, county of Franklin, and State of Ohio, have invented certain new and useful Improvements in Tire-Tread-Building Machines, of which the following is a full, clear, and exact disclosure.

This invention relates to tire tread building machines, and has for an object to provide a machine for economizing in manual labor and time incident to building treads upon tire carcasses. Hitherto, the building of treads upon tire carcasses has been manually performed, the carcass being supported upon a revolving form and the various sheets of tread materials being manually pressed onto the rotating carcass in successive layers. This operation necessitates the expert operator performing a large amount of unskilled labor which the present invention entirely obviates.

The invention, moreover, makes provision for a skilled operator, an inspector, and an unskilled laborer, being simultaneously employed independently of each other, whereby the time spent and expense incident to the building of treads is greatly reduced.

To attain these ends, the invention embodies mechanism to present a carcass to the operator, to successively position required sheets of tread material upon the carcass, to impart a single revolution to the carcass as each sheet is presented thereto for building the material in layers upon the carcass, to pass the completed tire from the operator to an inspector, and to pass the inspected tire to an unskilled laborer for removal.

In the accompanying drawings forming a part of this specification.

Referring now to the drawings, in which like characters of reference designate similar parts, 20 designates the frame of the machine, the same being preferably formed cylindrical in contour and being bolted or otherwise secured on a bed plate 21. An annular turret 22 encircles the frame and is revolubly confined between outstanding guide flanges 23 on the frame. The turret is supported upon roller bearings 24 and carries a plurality of radially disposed arms 25, eight of these arms being shown in the present embodiment for the purposes of illustration. Each arm is equipped with a spindle 26 for supporting a form 27 of the usual and well known type employed during the building of a tire. Meshing bevel gears 28 and 29 connect the spindle with a driven shaft 30 that is secured longitudinally of the arm. The driven shafts 30 project through the turret and are then squared and slidably and non-rotatably fitted in a circumferential guide groove 31 formed in the frame whereby the forms are held against premature turning during movement of the turret. At a predetermined point on the frame, designated as the operator's station A, each driven shaft passes from the guide groove and is engaged by a drive shaft 32 which is mounted in bearings 33 and 34 in the frame and which rotates the corresponding form through a single revolution.

Figure 16:
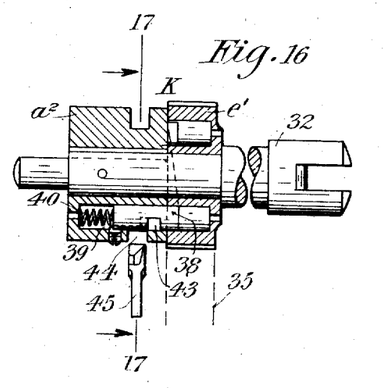
Fig. 16 is a sectional view showing a clutch.
Figure 17:
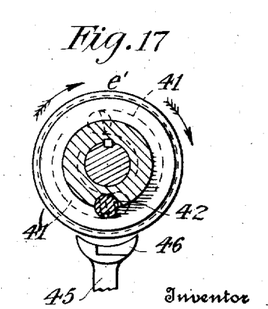
Fig. 17 is a sectional view on the line 17—17, Fig. 16.
Figure 18:
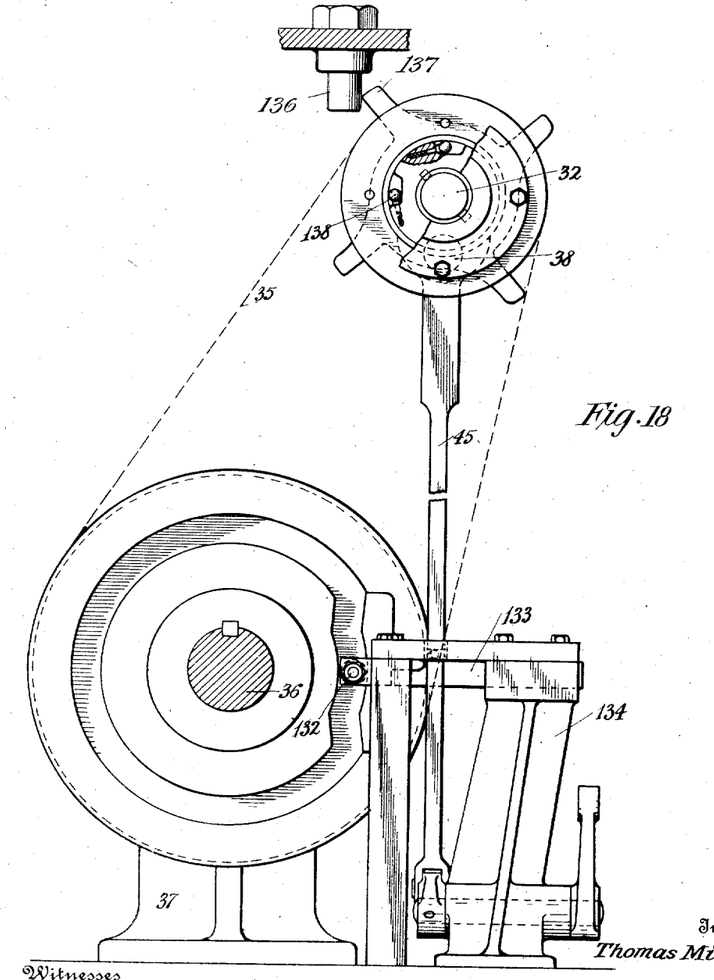
Fig. 18 is a detail view showing the clutch shift rod controlling means.

The drive shaft is confined to two revolutions by a clutch K, the drive member $e'$ of which is continuously driven by a chain 35 from the drive wheel $e$ on a main shaft 36 mounted in bearings 37 upon the bed plate of the machine. A spring-pressed coupling pin 38 is slidably and non-rotatably fitted in a recess 39 formed in the face of the driven member $a^2$ of the clutch and is urged by its spring 40 to ride into one of a plurality of concentric arcuate tapered slots 41 formed in the face of the drive member $e'$. The pin lodges against the shoulder or end wall 42 at the deep end of the slot and is carried around thereby with a resultant coupling of the clutch members to rotate the shaft. The pin is formed with a diagonally disposed groove 43 which registers with a circumferential groove 44 formed in the driven member $a^2$. A spring-retracted pedal $a$ is operatively connected as at $a'$ with a vertically movable shift rod 45 which has a beveled tip 46 that normally engages in the slot of the pin and holds the pin inoperative. Upon the operator depressing, then releasing the pedal, the rod releases the pin which is then urged by its spring to lock the clutch members together. The rod tip rides in the groove 44 of the driven member $a^2$ and at the end of the revolution enters the diagonal groove 43 of the pin and withdraws the pin to throw off the clutch. During this revolution of the form at the operator's station a layer of tread material is applied to the carcass as will presently appear.

Figure 11:
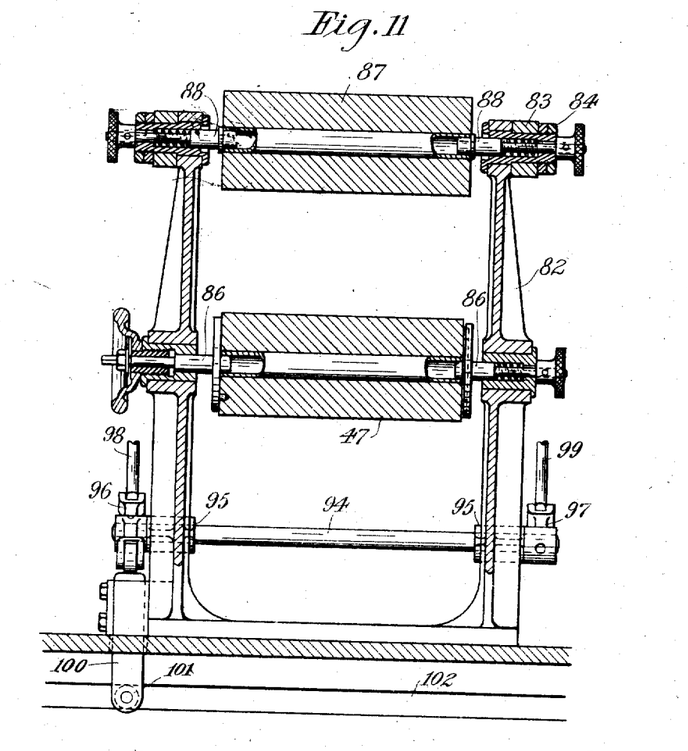
Fig. 11 is a sectional view showing a stock roll and take up roll and their mountings.
Figure 12:
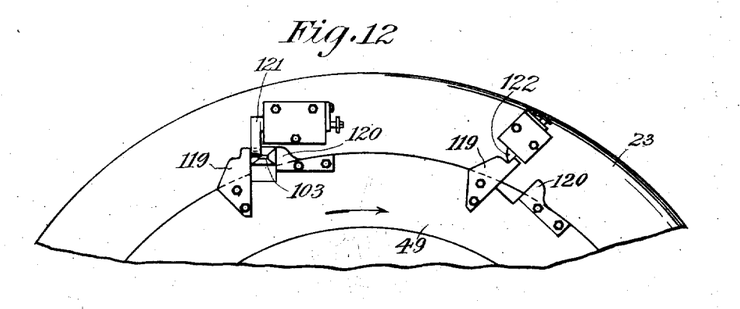
Fig. 12 is a fragmentary plan view showing the turntable locking mechanism.
Figure 13:
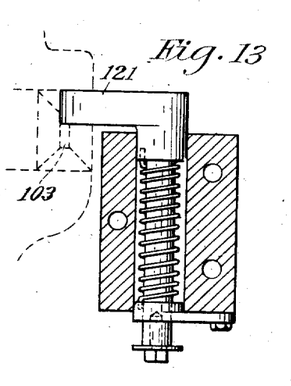
Fig. 13 is a detail sectional view showing one of the latches.
Figure 14:
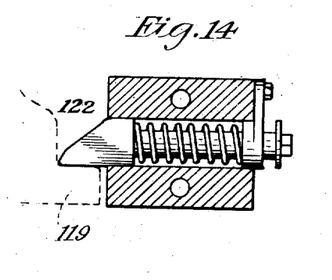
Fig. 14 is a detail sectional view showing another of the latches.

The tread materials are spooled upon respective stock rolls 47 carried on respective brackets 48, in the present embodiment there being eight of these brackets shown. The brackets are mounted on a turntable 49 which is fixed on shaft 50 that is mounted to turn in a bearing 51 on the bed plate. The brackets 48 are presented successively in juxtaposition to the form at the operator's station by the step movements of the turntable. The operator presses the free end of the sheeted material of the juxtaposed bracket onto the carcass and by the subsequent single revolution of the latter the material is fed from the stock roll and accumulates on the carcass in a single layer.

For advancing the turntable step by step a shaft 52 is mounted in bearing 53 on the bed plate and is equipped with a clutch K', similar to the clutch K, the drive member $y'$ of this clutch being driven from a drive wheel $y$ on the main shaft 36 by chain 54. A shift rod 45', similar to the shift rod of the clutch K, is operated through the instrumentality of a spring-retracted pedal $b$, similar to the pedal $a$, to restrict the shaft to a single revolution. A cam 55 is fixed to the shaft and engages the sprockets 56 of a pin wheel 57 that is fixed to the turntable shaft 50, the cam advancing the wheel one spoke at each revolution with a resultant actuation of the turntable one step. The turntable is thus advanced step by step until the complete cycle is made and a layer of tread material from each stock roll is built upon the carcass.

Figure 15:
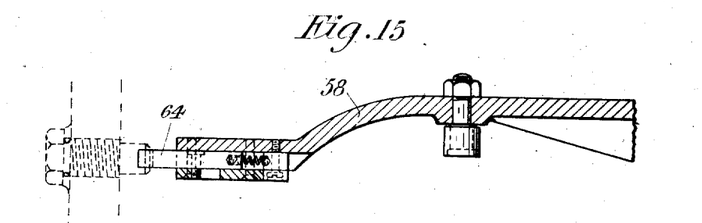
Fig. 15 is a fragmentary sectional view showing the turntable actuating arm.

During the final step of each cycle made by the turntable the turret is automatically advanced one step by a lever 58 which is pivoted to swing horizontally on the turntable shaft 50 and projects from a slot 59 in the frame into the path of a plurality of studs 60 carried by the turret. During forward movement, the lever engages with one of the lugs and advances the turret one step, the tip 64 of the lever being pivoted and spring-pressed to override and move to operative position in rear of the next succeeding lug during retrograde movement of the lever. By this simultaneous movement of the turntable and turret, the finished tire is passed over from the operator's station and a carcass together with the material for the initial tread layer presented at the station.

For actuating the turret step by step, the cam cylinder 61 is fixed on the shaft 65 that is mounted in bearings 66 on the frame. The shaft is actuated through a single revolution by means of a clutch $K^2$, similar to the clutch K, the drive member $x'$ of the clutch being continuously driven from a drive wheel $x$ on the main shaft by a chain $56^x$. A rock lever 67, fulcrumed on a standard 68 carried by the bed plate, is connected at one end to the shift rod $45^2$ of the clutch $K^2$ and carries a roller 69 on the free end which rides in a cam groove 70 formed in the pin wheel 57. There is a cam projection 71 in this groove which underrides and lifts the roller, thereby rocking the rock lever to operate the shift rod and throw in the clutch automatically. This actuation of the clutch to advance the turntable one step is timed to occur at the beginning of the final step of the cycle made by the turntable.

Figure 1:
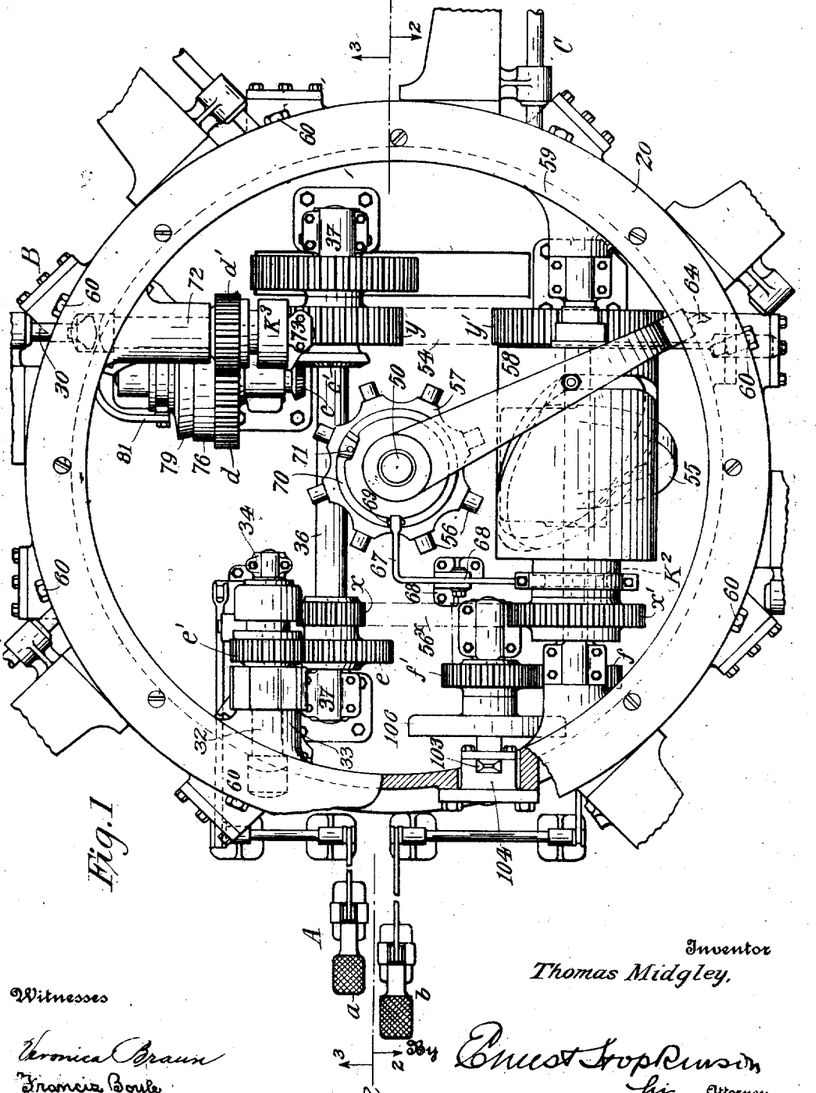
Figure 1 is a plan view of the machine with parts removed.
Figure 2:
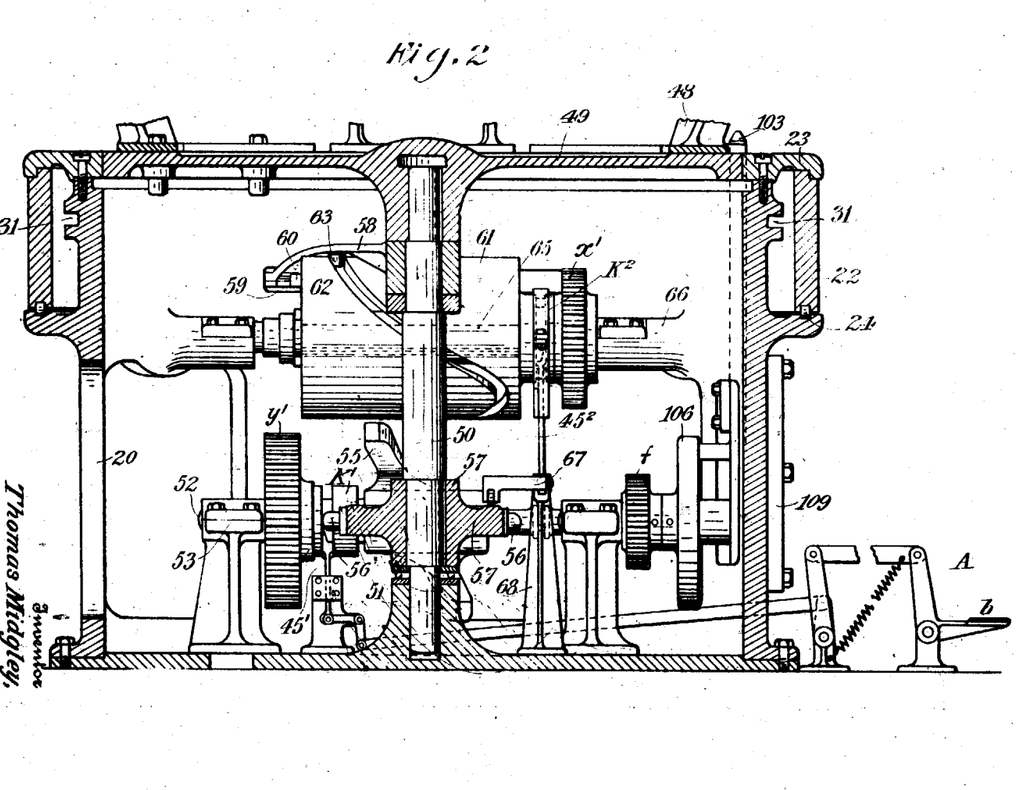
Fig. 2 is a longitudinal sectional view on the line 2—2, Fig. 1, looking in direction of arrow 2.
Figure 3:
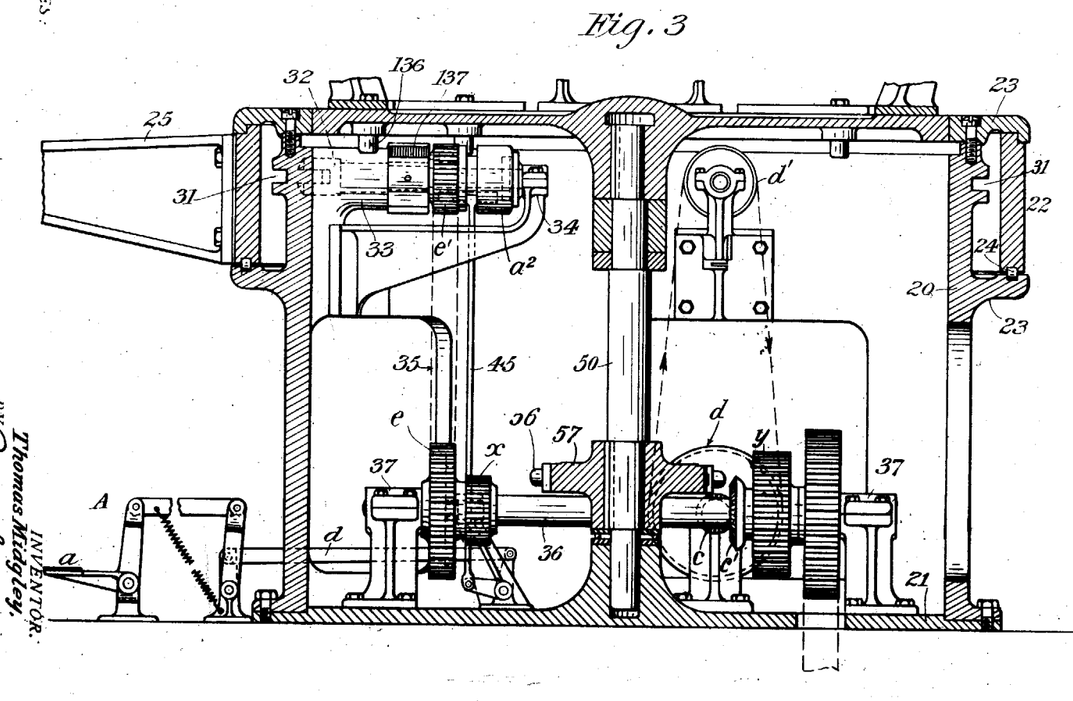
Fig. 3 is a longitudinal section view on the line 2—2, Fig. 1, looking in direction of arrow 3.
Figure 4:
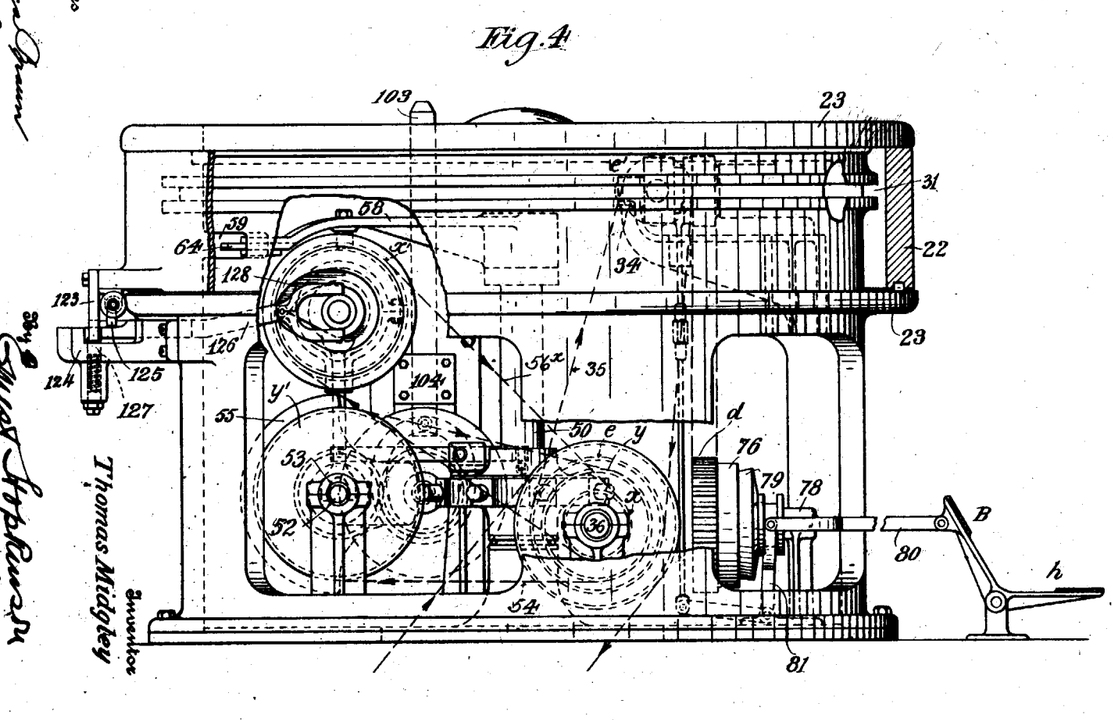
Fig. 4 is a rear elevation of the machine with parts broken away and parts in section.
Figure 5:
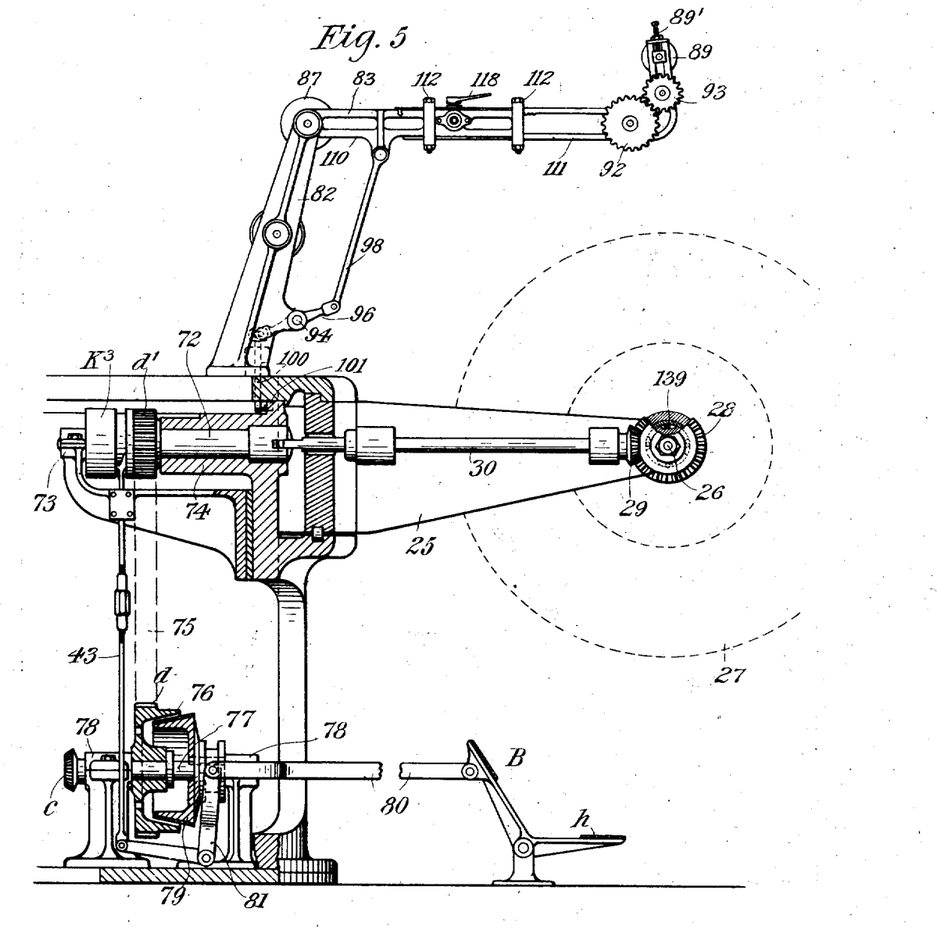
Fig. 5 is a sectional view showing the parts at the inspector's station.
Figure 6:
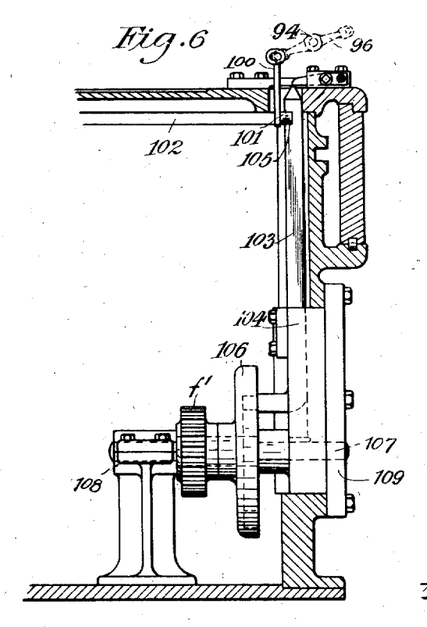
Fig. 6 is a sectional view showing the turntable locking means at one limit of movement.
Figure 7:
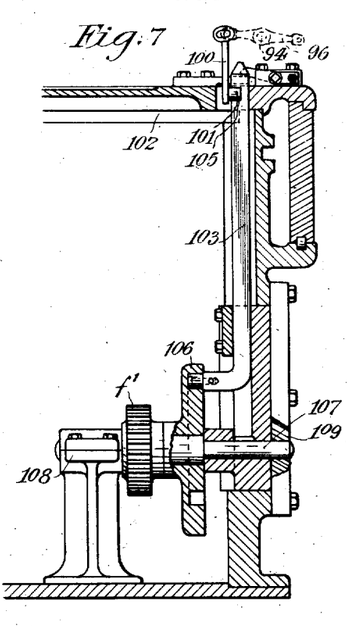
Fig. 7 is a similar view showing the parts in an opposite limit of movement from that shown in Fig. 6.

The completed tire is advanced by the step movement of the turret to the inspector's station B, located at about 90 degrees from the operator's station, where the tire may be rotated by power or manually during inspection for imperfections. At this point the shaft 30 of the finished tire form passes out of the guide groove 31 of the frame and is engaged by a drive shaft 72, similar to the drive shaft 32 at the operator's station A. This shaft is mounted in bearings 73 and 74 on the frame and is equipped with a clutch K³, similar to the clutch K, the drive member d' being driven by a chain 75 from the drive member d of a friction clutch 76 carried on a counter shaft 77. The counter shaft is mounted in bearings 78 on the bed plate and is continuously driven from the main drive shaft by meshing beveled gears c and c'. The drive member 79 of the friction clutch is controlled by a pedal h and shift link 80, the latter being connected by an angular rock lever 81 to the shift rod 45³ of the clutch K³.

The friction clutch 76 and clutch K³ are normally inactive and permit of the form being manually rotated by the inspector. Upon the pedal h being actuated to throw in the friction clutch, the shift rod 45³ will be withdrawn to throw in the clutch K³ for continuously rotating the tire. The friction clutch functions to prevent the tire from becoming power-driven while being manually rotated. Were the member d' of the clutch K³ continuously driven, the clutch would become active with the resultant power-drive of the shaft as soon as the rotation of the member d of the clutch carried the coupling pin from engagement with the stationary tip of the shift rod 45³.

Figure 8:
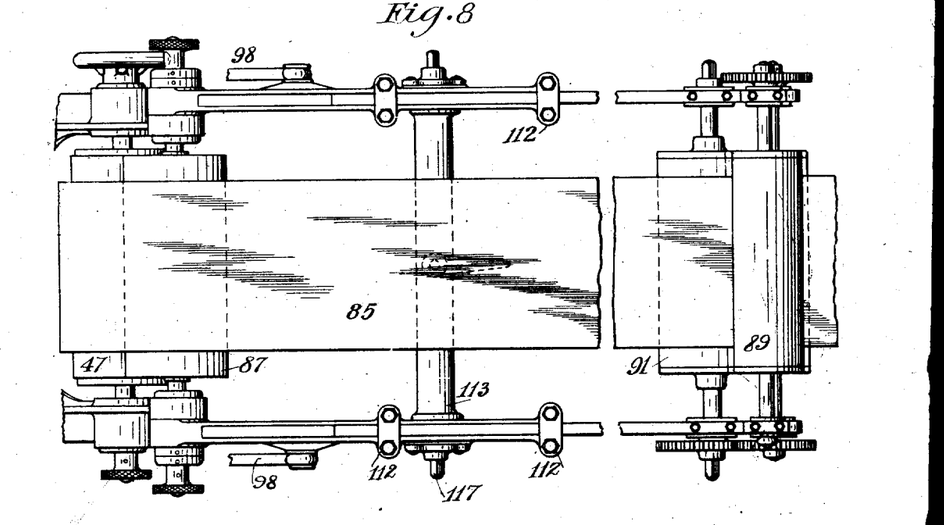
Fig. 8 is a fragmentary plan view of a tread material supporting-bracket.
Figure 9:
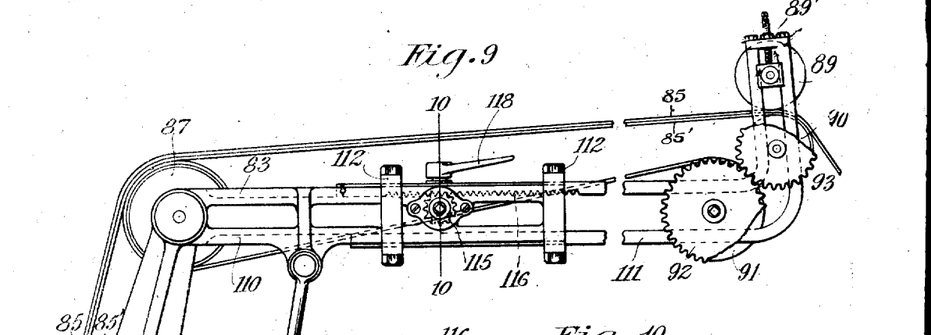
Fig. 9 is a side elevation of the parts shown in Fig. 8.

The brackets 48 are identical in construction and each comprises a skeleton frame 82, to the upper end of which a skeleton arm 83 is pivoted as at 84. The tread material 85, backed by fabric 85' which separates the convolutions, is spooled upon the stock roll 47, as before stated, the roll being revolubly and removably supported on the frame by gudgeons 86. A take-up roll 87 for the fabric is positioned on the frame above the roll 47 and is revolubly and removably supported by gudgeons 88. The sheet from the roll 47 passes over the take-up roll and rotates the latter by frictional engagement therewith. The sheet then passes longitudinally of the arm 83 to feed rolls 89 and 90 carried on the free end of the arm, the upper roll being pressed by feed screws 89'. The fabric is separated during passage between the feed rolls, and passes back under the lower feed roll, then over the soft-faced drive roll 91 and is firmly wound upon the rotating take-up roll. When each bracket arrives at the operator's station A, the pivoted arm thereof is swung down, by mechanism hereinafter described, until the soft-faced drive roll frictionally engages and is rotated by the tire form. Meshing gears 92 and 93 connect the feed roll for rotation with the drive roll, these gears being proportioned to feed the material at a trifle less speed than the speed of the revolving form, so that a tension is exerted on the material and causes the same to curve downward at the side edges and conform to the contour of the carcass.

For operating the arm 83, a rock shaft 94 is journaled in bearings 95 carried on the frame and has crank connections 96 and 97 with links 98 and 99 which are pivotally connected with the arm. A link 100 is connected with the crank 96 and is equipped with a roller 101 which rides in a guide groove 102 formed in the inner face of the frame and normally holds the arm raised. At the operator's station the guide groove is interrupted by a vertically movable bar 103 which is carried in a suitable guide 104 on the machine frame. The bar is formed with a groove 105 adapted to register with the guide groove and receive the roller at the end of a step actuation of the turntable. A cam 106 engages the lower end of the bar and during a single revolution operates to lift the bar, whereby the roller is moved out of the groove and the arm swung down to press drive roll onto the carcass, then to hold bar raised for a period to maintain the arm in operative position during application of the tread material to the carcass, and finally to lower the bar whereby the roller is carried back into registration with the guide groove and the arm swung up to released position. The cam is fixed to a stub shaft 107 carried in the bearings 108 and 109, the stub shaft being connected for a simultaneous single revolution with the turntable actuating shaft 52 by means of meshing gears f and f'. The cams 55 and 106 are so relatively timed that the cam 55 operates on the pin wheel 57 before the cam 106 operates on the bar, so that the above described operation of the bar alternates with the step movement of the turntable. Thus upon a single depression of the pedal b the turntable is advanced a step and presents a roll of tread material to the carcass and is immediately followed by the lowering of the arm to apply the material.

Figure 10:
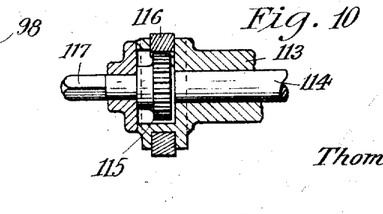
Fig. 10 is a fragmentary sectional view on the line 10—10, Fig. 9.

The arms 83 are shown extensible whereby they may be adjusted to suit various conditions of service. Each arm preferably comprises inner and outer members 110 and 111 connected by strap guides 112. A casing 113 connects the outer members together for simultaneous movement and houses a shaft 114 that carries pinions 115 which mesh with rock teeth 116 formed on the inner members. The shaft has squared ends 117 to permit application of a wrench for turning the shaft to advance or retract the outer members and vary the length of the arm. The shaft is locked against rotation by a latch 118 to hold the arm at any adjusted length.

For locking the turntable against movement during application of the tread material to the carcass, pairs of radially disposed stop plates 119 and 120 are arranged 45 degrees apart on the turntable and overlap the stationary flange 23 of the machine frame, the plates of each pair passing along opposite sides of the reciprocating link 100 of the corresponding bracket 48. A pair of spring-pressed latches 121 and 122 are disposed 45 degrees apart on said flange in the path of the plates and co-act on corresponding plates 119 of two adjacent pairs of plates to halt the turntable. At the end of the step rotation of the turntable, the latch 121 which has a limited longitudinal sliding movement and rocking movement on its axis, overrides the plate 120 and drops into engagement with the advance edge of the plate 119 thereby preventing further advance of the turntable, while the latch 122 overrides both plates of the pair of plates next in advance and engages in rear of the plate 119 of said pair to prevent retrograde movement of the turntable. The bar 103 now rises, as above stated, and passes between the plates 119 and 120, thereby locking the turntable stationary to the machine frame, and at the same time rocks up the latch 121, the controlling spring of the latch then urging the latch out upon the top face of the plate 119, thereby releasing the turntable for the next step rotation.

Figure 19:
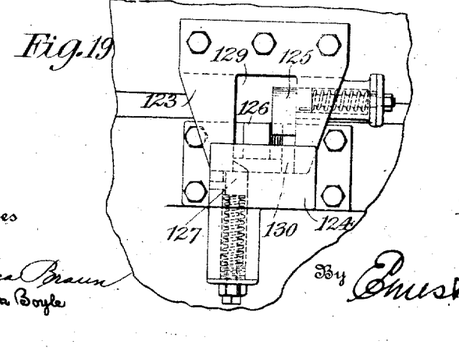
Fig. 19 is a fragmentary view in elevation showing the turret locking means.
Figure 20:
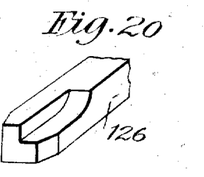
Fig. 20 is a fragmentary perspective view showing the tip of the turret locking bar.

To halt the turret and hold it stationary at the end of each step movement, a plurality of plates 123 are disposed 45 degrees apart on the face of the turret, and depend over the machine frame. An angular bracket 124 is positioned on the machine frame to receive one of the plates at the end of the step movement of the turret. Each plate carries a latch 125 similar to the above described latch 121. A locking bar 126 projects slidably through an opening in the machine frame and extends normally into the path of the latch, the latter impinging against the bar at the end of the step movement of the turret and halting further advance of the turret. An upstanding spring-pressed latch 127 carried by the bracket simultaneously engages a slot 129 in the plate and prevents retrograde movement of the turret. A cam groove 128 formed in the end face of the cam cylinder 61 actuates and times the bar 126 to slide outwardly upon the turret being halted, the bar having a cam surface which underrides and rocks up the latch 125, the bar passing on through the slot 129 in the plate and terminally confronting the bracket to positively lock the turret stationary, the controlling spring of the latch meanwhile urging the raised latch out onto the top face of the bar to release the turret for the next step in rotation.

The operation of the machine is as follows: Suppose that the turret and the turntable are respectively presenting a carcass and the material for the initial tread layer at the operator's station A, and that the material is being held against the carcass by the downwardly swung arm 83 of the material supporting bracket. The operator first depresses the pedal $a$ to rotate the carcass through a single revolution whereby a single initial layer of the material is applied to the carcass. The operator next depresses the pedal $b$ and the following movements take place: The arm 83 rises to released position, the turntable then advances one step and presents the next succeeding bracket at the operator's station, and the arm of this bracket then rocks down and disposes the end of the material on the initially applied tread layer. By thus alternately depressing the pedals $a$ and $b$, the material from all the rolls will be applied in successive layers to the carcass until the turntable has made a complete cycle, the turret being automatically advanced a step as the turntable completes its cycle, whereby a carcass and the material for the initial tread layer therefor arrive at the operator's station simultaneously with the passing away of the completed tire to the inspector's station. Upon the arrival of the tire at the latter's station, the inspector examines the tire for imperfections, turning the same manually or by power. At the next step movement of the turret, the tire passes away from the inspector's station to a laborer's station C and is there removed by the laborer and replaced with a carcass which eventually arrives at the operator's station.

To confine the form to a single revolution the wheel $e$ has a cam groove 131 which operates on a pin 132 to move the slide 133 carried by a bracket 134 across the path of a pin 135 on the shift rod and prevent the latter from disengaging the clutch pin 38 until the shaft 32 has made two revolutions and imparted through the beveled gears 28 and 29 a single revolution to the form.

To step the joints of the layers one-eighth of the circumference apart, studs 136 on the turntable engage and advance a spoked wheel 137 keyed to the shaft 32 causing the latter to make a one-quarter turn and impart a one-eighth turn to the shaft 26 as each stock roll is brought to the form. The clutch K has a roller ratchet 138 which permits this actuation of the shaft 32 without disturbing the position of the clutch.

The gears 28 are each equipped with a roller ratchet 139 to permit turning of the forms by hand at any time irrespective of their positions.

Having thus described my invention, what I claim and desire to protect by Letters Patent is:

1. A tire building machine embodying a power driven form for supporting a tire carcass, pivoted feed rolls for delivering sheeted material to the carcass, and means for positively rocking the feed rolls in the plane of the form toward and away from the form.

2. A tire building machine embodying a rotatable form for supporting a tire carcass, pivoted feed rolls, means for moving the feed rolls in a path transverse of the form, and means for rocking the feed rolls radially toward the form for frictional driving by the form to deliver material to the carcass.

3. A tire building machine embodying a rotatable form for supporting a tire carcass, pressure members movable successively into juxtaposition to the form, automatic means for then positively moving the members in the plane of the form toward and away from the form, and feed rolls carried by the members and frictionally driven from the form for delivering material to the carcass.

4. A tire building machine embodying a rotatable form for supporting a tire carcass, a transversely movable support, pressure arms pivoted on the support for successive juxtaposition to the form, means for positively rocking the arms in the plane of the form toward and away from the form, and feed rolls on the arms frictionally driven from the form for delivering sheeted material to the carcass.

5. A tread building machine embodying a power driven form for supporting a tire carcass, a transversely movable support, pivoted arms mounted on the support for successive juxtaposition to the form, feed rolls on the arms for delivering sheeted material to the carcass, and pressure means rocking the arms to position the feed rolls for frictional driving from the form.

6. A tread building machine embodying a power driven form for supporting a tire carcass, a step-actuated turntable, pivoted arms mounted on the turntable for successive juxtaposition to the form by corresponding step movements of the turntable, feed rolls on the arms for delivering tread material to the carcass, and pressure means operating on the arms alternately with the step movements of the turntable to position the feed rolls for frictional driving from the form.

7. A tread building machine embodying a rotatable form for supporting a tire carcass, a transversely movable support, stock rolls for tread material backed by fabric mounted on the support for successive juxtaposition to the form, pivoted feed rolls for separating the tread material from the fabric, means for positively rocking the feed rolls in the plane of the form toward and away from the form, and feeding the material to the carcass, and take-up rolls for the fabric.

8. A tread building machine embodying a rotatable form for supporting a tire carcass, spaced stock and feed rolls for carrying sheeted tread material backed by fabric, a take-up roll for the fabric disposed intermediate the stock and feed rolls and rotated by friction of the sheet passing thereover from the stock to the feed rolls, a drive roll for driving the feed rolls to separate the material from the fabric and feed the material to the carcass, and means for positively moving the feed and drive rolls as a unit in the plane of the form toward and away from the form.

9. A tread building machine embodying a rotatable form for supporting a tire carcass, a stock roll for carrying sheeted tread material, feed rolls for delivering the tread material to the carcass, a pivoted drive roll geared to the feed rolls for rotating said feed rolls, and power operated means operating to positively rock said drive roll in the plane of the form toward the form for frictional driving from the form.

10. A tread building machine embodying a frame, a turret revolubly mounted on the frame, forms carried by the turret for supporting tire carcasses, driven shafts carried by the turret for rotating respective forms, a drive shaft on the frame pre-positioned to automatically clutch said driven shafts successively, manually controlled means for actuating the drive shaft after it engages each driven shaft for rotating the corresponding form, and stock rolls for supplying sheeted tread material to the carcasses during rotation of the forms.

11. A tread building machine embodying a frame, a revoluble turret thereon, a revoluble form on the turret for supporting a tire carcass, a driven shaft on the turret for rotating the form, a guide on the frame receiving the inner end of said shaft and holding said shaft against rotation, a drive shaft on the frame pre-positioned to interrupt the guide and clutch the driven shaft as it passes from said guide, means for rotating said drive shaft when clutching said driven shaft to rotate the form, and a stock roll on the turret for supplying sheeted tread material to the carcass during rotation of the form.

12. A tread building machine embodying a frame, a revoluble turret thereon, a revoluble form on the turret for supporting a tire carcass, a guide on the frame, a driven shaft on the turret for rotating said form and having a squared end riding in said guide, a drive shaft on the frame having a grooved end to receive the squared end of the driven shaft, a clutch on said drive shaft confining the shaft to a single revolution for pre-positioning said shaft to engage the driven shaft as it passes from the guide and imparting a single revolution to the form, and a stock roll for supplying a layer of sheeted material to the carcass during the single revolution of the form.

13. A tread building machine embodying a frame, a step-rotated turntable thereon, a turret mounted on the frame for a step rotation at the end of the turntable cycle, revoluble forms on the turret for supporting tire carcasses, a plurality of drive shafts on the frame, a guide on the frame positioning a plurality of said forms at each step of the turret to be rotated by said drive shafts and stock rolls positioned successively during the turntable cycle to supply sheeted tread material to the carcass on one of the rotating forms.

14. A tread building machine embodying a frame, a revoluble form for supporting a tire carcass, a laterally movable support, a pivoted arm thereon, feed rolls on the arm for carrying sheeted tread material, a guide on the frame, a link for swinging the arm radially with respect to the form, a roller on the link riding in said guide to hold the arm raised, and a bar movable across said guide for engaging and moving the roller out of the guide to swing down the arm and position the feed rolls for frictional driving by the form.

15. A tread building machine embodying a frame, a revoluble form for supporting a tire carcass, a step-rotated turntable, feed rolls on the turntable for carrying sheeted tread material, a reciprocatory bar on the frame actuated alternately with the turntable to position said feed rolls for frictional driving by the form, a stop on the turntable for engaging the bar to anchor said turntable, and a spring-pressed latch mounted on the form to engage the stop for halting said turntable and disposed in the path of the bar for release thereby.

16. A tread building machine embodying a frame, a revoluble form for supporting a tire carcass, a step rotated turntable, feed rolls for carrying sheeted tread material mounted on the turntable for successive juxtaposition to the form, spaced stops on the turntable, a spring-pressed latch positioned on the frame to project in rear of one of the stops at the end of each step and prevent retrograde movement of the turntable, a longitudinal spring-pressed axially rotatable latch positioned on the frame to project in advance of the other stop at the end of each step and prevent advance movement of the turntable, and a bar on the frame actuated to rock the last named latch out of the path of the last named stop, the controlling spring of said latch then urging the latch to override said stop and release the turntable for the next rotation.

17. A tread building machine embodying a frame, a turntable and a turret mounted for independent step rotation on the frame, interlocking means between the turntable and frame and between the turret and frame for positively anchoring the turntable and the turret to the frame against advance and retrograde movement at the end of their respective steps, forms on the turret for supporting tire carcasses, and stock rolls on the turntable for supplying sheeted tread material to the carcasses.

18. A machine of the character described, comprising a frame, a power driven annular form mounted in said frame, a pivoted frame mounted adjacent said annular form, a friction pulley mounted in said pivoted frame, a pair of co-acting rollers, between which a sheet of fabric is arranged to be passed, means interposed between said friction pulley and said rollers for rotating said rollers, means for normally holding said pivoted frame in position to hold said friction pulley out of engagement with said form, said friction pulley arranged to engage said form when the sheet fabric is attached to said form.

Signed at Detroit, county of Wayne, State of Michigan, this 27th day of February, 1914.

THOMAS MIDGLEY.

Witnesses:
J. H. SWIFT,
E. LA BUSCHEWSKY.